(12) United States Patent
Rysinski et al.

(10) Patent No.: US 7,872,682 B2
(45) Date of Patent: Jan. 18, 2011

(54) ECLIPSE ELIMINATION BY MONITORING THE PIXEL SIGNAL LEVEL

(75) Inventors: Jeffrey Rysinski, Boise, ID (US); Sanjayan Vinayagamoorthy, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 1071 days.

(21) Appl. No.: 11/125,097

(22) Filed: May 10, 2005

(65) Prior Publication Data

US 2006/0256220 A1 Nov. 16, 2006

(51) Int. Cl.
*H04N 3/14* (2006.01)
*H04N 5/335* (2006.01)
(52) U.S. Cl. ............... 348/297; 348/294; 348/308; 250/208.1
(58) Field of Classification Search ......... 348/294–311; 250/208.1
See application file for complete search history.

(56) References Cited

U.S. PATENT DOCUMENTS 6,803,958 B1 10/2004 Wang
6,873,363 B1 3/2005 Barna et al.
7,167,200 B1* 1/2007 Phan et al. ............ 348/308
7,170,556 B2* 1/2007 Kokubun et al. ........ 348/241
7,372,492 B2* 5/2008 Ahn .................. 348/308
2003/0132786 A1* 7/2003 Styduhar ............. 327/66
2004/0036783 A1* 2/2004 Barna ................. 348/300
2005/0225653 A1* 10/2005 Masuyama et al. ...... 348/241

FOREIGN PATENT DOCUMENTS

KR 2004-38225 5/2004

OTHER PUBLICATIONS

Korean Office Action dated Mar. 30, 2009, for corresponding Korean Patent Application No. 10-2007-7027101.

* cited by examiner

*Primary Examiner*—Tuan Ho
*Assistant Examiner*—Anthony J Daniels
(74) *Attorney, Agent, or Firm*—Dickstein Shapiro LLP

(57) ABSTRACT

An anti-eclipse circuit for an imaging sensor monitors the photo signal level output by a pixel to determine whether the photo signal corresponds to the pixel being operated at a saturated state. If so, there is a risk that the pixel may be susceptible to an eclipse distortion. When the pixel is detected as being operated in a saturated state, the anti-eclipse circuit pulls up the reset signal level previously stored in a sample and hold circuit to an appropriate voltage level in order to prevent an eclipse distortion from arising.

10 Claims, 8 Drawing Sheets

US 7,872,682 B2

ECLIPSE ELIMINATION BY MONITORING THE PIXEL SIGNAL LEVEL

FIELD OF INVENTION

The present invention relates generally to pixel architectures for semiconductor imagers. More specifically, the present invention relates to an anti-eclipse system for image sensors.

BACKGROUND OF THE INVENTION

FIG. 1 is an illustration of a conventional four transistor (4T) pixel 100. The pixel 100 includes a light sensitive element 101, shown as a photodiode, a floating diffusion node C, and four transistors: a transfer transistor 111, a reset transistor 112, a source follower transistor 113, and a row select transistor 114. The pixel 100 accepts a TX control signal for controlling the conductivity of the transfer transistor 111, a RST control signal for controlling the conductivity of the reset transistor 112, and a ROW select signal for controlling the conductivity of the row select transistor 114. The voltage at the floating diffusion node C controls the conductivity of the source follower transistor 113. The output of the source follow transistor 113 is presented at node B when the row select transistor 114 is conducting.

The states of the transfer and reset transistors 111, 112 determine whether the floating diffusion node C is coupled to the light sensitive element 101 for receiving a photo-generated charge generated by the light sensitive element 101 following a charge integration period, or a source of pixel power VAAPIX from node A during a reset period.

The pixel 100 is operated as follows. The ROW control signal is asserted high to cause the row select transistor 114 to conduct. At the same time, the RST control signal is asserted high while the TX control signal is asserted low. This couples the floating diffusion node C to the pixel power VAAPIX at node A, and resets the voltage at node C to the pixel power VAAPIX. The pixel 100 outputs a reset signal Vrst at node B. As will be explained in greater detail below in connection with FIG. 2, node B is typically coupled to a column line 215 (FIG. 2) of an imager 200.

After the reset signal Vrst has been output, the RST control signal is asserted low. The light sensitive element 101 is exposed to incident light and accumulates charge based on the level of the incident light during a charge integration period. After the charge integration period, the TX control signal is asserted. This couples the floating diffusion node C to the light sensitive element 101. Charge flows through the transfer transistor 111 and diminishes the voltage at the floating diffusion node C. The pixel 100 outputs a photo signal Vsig at node B. The reset and photo signals Vrst, Vsig are different components of the overall pixel output (i.e., Voutput=Vrst−Vsig), which is typically processed by an imager 200 (FIG. 2) as explained in greater detail below.

FIG. 2 is an illustration of an imager 200 that includes a plurality of pixels 100 forming a pixel array 201. Due to space limitations the pixel array 201 is drawn as a 4 row by 4 column array. One skilled in the art would recognize that in most imagers 200 the pixel array 201 would ordinarily include many more rows and columns, and thus, many more pixels 100.

The imager 200 also includes row circuitry 210, column circuitry 220, a digital conversion circuit 230, a digital processing circuit 240, and a storage device 250. The imager 200 also includes a controller 260. The row circuitry 210 selects a row of pixels 100 from the pixel array 201. The pixels 100 in the selected row output, at different times, their reset and pixel signals Vrst, Vsig to the column circuitry 220, via column lines 215. The column circuit 220 samples and holds the reset and pixel signals Vrst, Vsig. The column circuitry 220 also forms an analog pixel output signal Vpixel from the difference Vrst−Vsig, and outputs the Vpixel signal on lines 216 to the digital conversion circuit 230.

Now referring to FIG. 3, it can be seen that the column circuitry 220 comprises a plurality of analog pixel processing circuits 221 and a plurality of corresponding load circuits 310. Each column line 215 is coupled, in parallel at node D, to a respective analog processing circuit 221 and a respective load circuit 310. Each analog pixel processing circuit 221 accepts the reset and pixel signals Vrst, Vsig output from a pixel at different times on column line 215, and forms an analog pixel signal Vpixel as the difference between the reset and pixel signals Vrst, Vsig (i.e., Vpixel=Vrst−Vsig). The signal Vpixel is output on line 216.

FIG. 4 is a more detailed illustration of a single analog pixel processing circuit 221, its associated column and output lines 215, 216 and load circuit 310. The analog pixel processing circuit 221 includes a first signal path SP1 for sampling and holding a reset signal Vrst and a second signal path SP2 for sampling and holding a photo signal Vsig. The sampled and held Vrst, Vsig signals are provided to a gain stage 450, which outputs the pixel signal Vpixel on line 216. Additionally, the analog processing circuit 221 further includes switches 431, 432, and 433.

The first signal path SP1 includes switch 421, capacitor 441, and switch 434. The state of switch 421 is controlled by the sample and hold reset (SHR) control signal, which is asserted high when a pixel is outputting the reset signal Vrst on line 215. The SHR control signal is asserted low if the pixel is not outputting a reset signal Vrst.

The second signal path SP2 includes switch 422, capacitor 442, and switch 435. The state of switch 421 is controlled by the sample and hold signal (SHS) control signal, which is asserted high when a pixel is outputting the photo signal Vsig on line 215. The SHS control signal is asserted low if the pixel is not outputting a photo signal Vsig.

The circuit 221 operates as follows. First, before a pixel coupled to line 215 outputs either the reset or photo signals Vrst, Vsig, the capacitors 441, 442 must be set to a known state. Thus, switches 421, 422, 432, 433, 434, and 435 are each opened, while switch 431 is closed. This equalizes the charges on the sides of capacitors 441, 442 closest to node D. Switches 432, 433 are then closed, to couple the sides of capacitors 441, 442, closest to gain stage 450 to a clamp voltage Vcl. Switches 431, 432, 433 are then opened.

The pixel coupled to output line 215 then outputs a reset signal Vrst on line 215. The SHR control signal is asserted high while the SHS control signal is asserted low. This combination of the states of the SHR and SHS control signals causes switch 421 to close while maintaining switch 422 in an open state, thereby coupling only the first signal path SP1 to node D. The reset signal Vrst output by the pixel causes the charge level of capacitor 441 to change. Once the pixel has completed outputting the reset signal Vrst, the SHR control signal is asserted low, causing switch 421 to open, thereby decoupling the capacitor 441 from node D.

The pixel coupled to output line 215 then outputs a photo signal Vsig on line 215. The SHS control signal is asserted high while the SHR control signal is asserted low. This combination of the states of the SHR and SHS control signals causes switch 422 to close while maintaining switch 421 in an open state, thereby coupling only the second signal path SP2 to node D. The photo signal Vsig output by the pixel causes the charge level of capacitor 442 to change. Once the pixel has completed outputting the photo signal Vsig, the SHS control signal is asserted low, causing switch 422 to open, thereby decoupling the capacitors 442 from node D.

Switches 434 and 435 are then simultaneously closed, which couples the gain stage 450 to capacitors 441, 442. The gain stage 450 produces an analog pixel signal Vpixel equal to the difference Vrst−Vsig. The analog pixel signal Vpixel is output on line 216.

FIG. 5, is a more detailed illustration of the load circuit 310. The load circuit 310 is comprised of transistors 311 and 312, coupled in series by their sources and drains, between node D and a source of ground potential. The gate of transistor 311 is coupled to the VLN_enable control signal, which is used to switch transistor 311 between an "on" and an "off" state. The gate of transistor 312 is coupled to the VLN_bias control signal to control the conductivity of transistor 312 to a predetermined level.

The pixel 100 (FIG. 1) is susceptible to a type of distortion known as eclipsing. Eclipsing refers to the distortion arising when a pixel outputs a pixel signal corresponding to a dark pixel even though bright light is incident upon the pixel. Eclipsing can occur when a pixel is exposed to bright light, as the light sensitive element 101 can produce a large quantity of photogenerated charge. Once the level of the incident light exceeds a certain threshold, the light sensitive element 101 becomes saturated and has generated a maximum amount of charge. An eclipse condition can occur if the light sensitive element 101 produces so much charge that during the time between the falling edge of the RST control signal and the falling edge of the SHR control signal (i.e., when the transfer transistor 111 is set to a non-conducting state) at least some of the photo-generated charges spill over the transfer transistor 111 and make their way to the floating diffusion node C. This diminishes the reset voltage at the floating diffusion node and can cause the pixel 100 to output an incorrect (i.e., diminished voltage) reset signal Vrst. This, in turn, can cause the reset and photo signals Vrst, Vsig to be nearly the same voltage. For example, the photo and reset signals Vrst, Vsig may each be approximately 0 volts. The pixel output signal Vpixel which equals (Vrst−Vsig), can therefore become approximately 0 volts, which corresponds to an output voltage normally associated with a dark pixel.

An anti-eclipse circuit can be used to mitigate against the effect of eclipsing. Conventional anti-eclipse circuits detect the presence of an eclipse condition by monitoring the voltage level of the reset signal and determining if that voltage level is abnormally low. If so, the reset signal can be pulled up to the proper level by clamping the column output line to a voltage source. The proper voltage for the voltage source is the normal reset signal voltage level. Unfortunately, this voltage varies from imager to imager because the voltage is sensitive to semiconductor process variations. As a result, the voltage source is typically a controllable voltage source, such as a transistor having a source/drain coupled to a power supply voltage and a gate coupled to a control signal, typically designated as the AE_voltage bias signal. Post manufacturing calibration could be done to set the AE_voltage bias signal to a proper level to permit the anti-eclipse circuit to pull the reset signal to the proper voltage when an eclipse condition is determined. Accordingly, there is a need and desire for an anti-eclipse circuit, which is not dependent upon monitoring the voltage level of the reset signal, and which can operate without requiring calibration.

SUMMARY OF THE INVENTION

Exemplary embodiments of the method and apparatus of the present invention provide an anti-eclipse circuit for an imager. The anti-eclipse circuit permits a pixel to initially output a reset signal, which is sampled-and-held. Subsequently, when the pixel outputs a photo signal, which is also sampled-and-held. While the pixel is outputting the photo signal, the voltage level of the photo signal is monitored to determine whether the light sensitive element for producing photo-generated charges is saturated. If so, the pixel may be susceptible to an eclipse condition. Accordingly, the anti-eclipse circuit causes the previously sampled reset signal level to be pulled up to a proper voltage level, thereby ensuring that the reset signal voltage used for generating the analog pixel voltage is at a correct voltage level, thereby avoiding an eclipse condition.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 6:
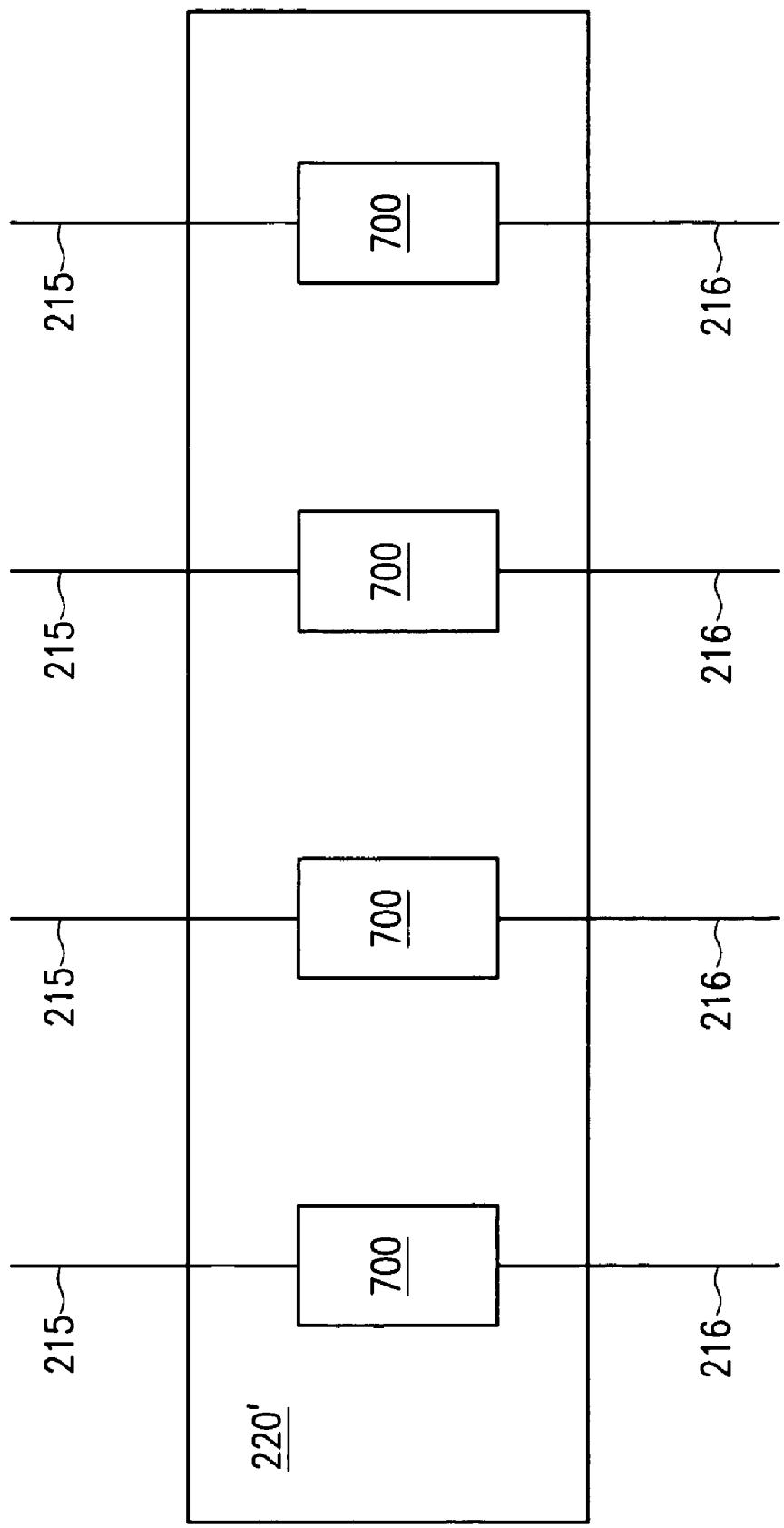
FIG. 6 illustrates a column circuit in accordance with an exemplary embodiment of the present invention.

Now referring to the drawings, where like reference numerals designate like elements, there is shown in FIG. 6, column circuitry 220' incorporating the anti-eclipse system of the present invention.

As illustrated, each column line 215 is associated with a processing block 700. Each column line 215 is used to provide to its associated processing block 700 a reset signal Vrst and a pixel signal Vsig (at different times). The processing block 700, as described in greater detail below, produces an analog pixel signal Vpixel, which is protected from eclipse distortion on line 216.

Figure 7:
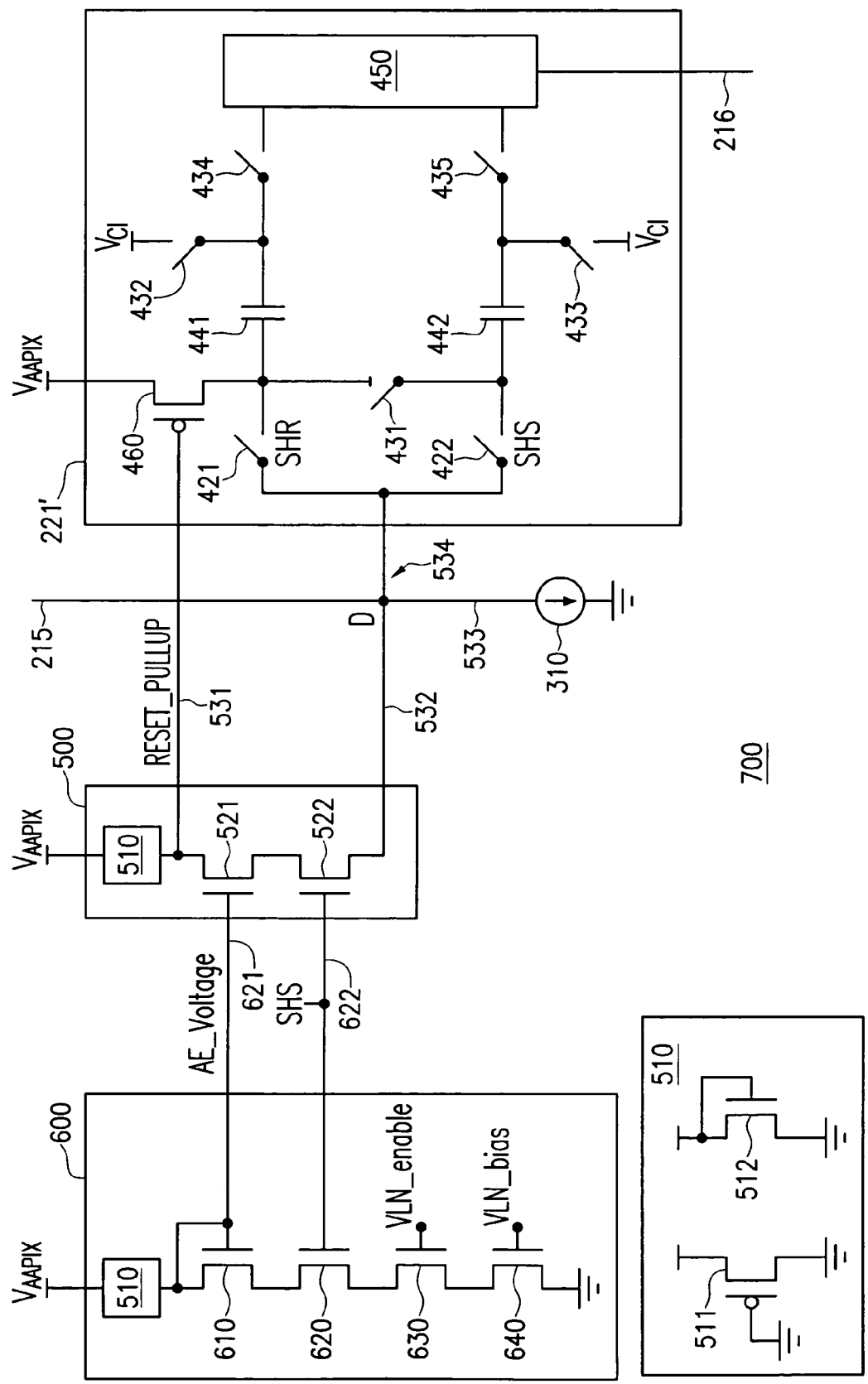
FIG. 7 illustrates a portion of the column circuitry of FIG. 6 in greater detail.

FIG. 7 is a more detailed illustration of processing block 700 of FIG. 6. The column line 215 is respectively coupled in parallel at node D via lines 532, 533, and 534 to a photo signal monitor circuit 500, a load circuit 310, and an analog processing circuit 221'. The photo signal monitor circuit 500 is also directly coupled to the analog processing circuit 221' via line 531. Additionally, the photo signal monitor circuit 500 is also coupled via lines 621, 622 to a helper circuit 600.

Figure 5:
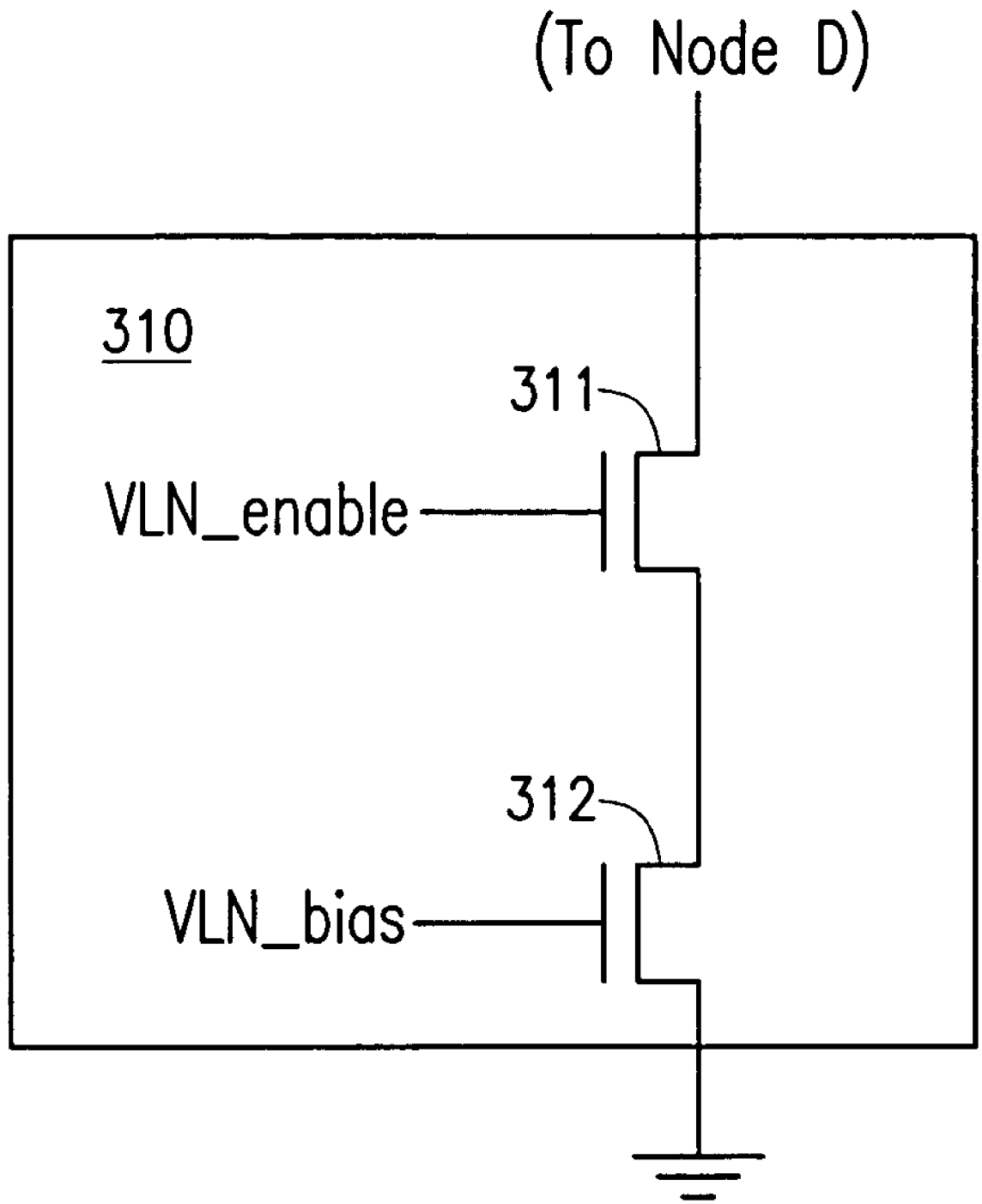
FIG. 5 illustrates the load circuit portion of the column circuitry in greater detail.

The helper circuit 600 generates the AE_voltage bias signal, which is supplied to the photo signal monitor circuit 500 via line 621. The helper circuit 600 includes a load 510 and transistors 610, 620, 630, and 640, which are respectively coupled in series via their sources and drains, between a source of power VAAPIX and ground potential. As illustrated in FIG. 7, exemplary embodiments of the load circuit 510 include a PMOS transistor 511 having its gate tied to the ground potential or an NMOS transistor 512 configured to operate as a diode. In one exemplary embodiment, each of the transistors 610, 620, 630, and 640 are NMOS transistors. Transistor 610 is configured as illustrated to output the AE_voltage bias signal on line 621. The gate of transistor 620 is coupled to the SHS control signal via line 622. The gates of transistor 630 and 640 are respectively supplied the VLN_enable and VLN_bias control signals used for enabling and controlling the operation of the load circuit 310 (FIG. 5).

Figure 1:
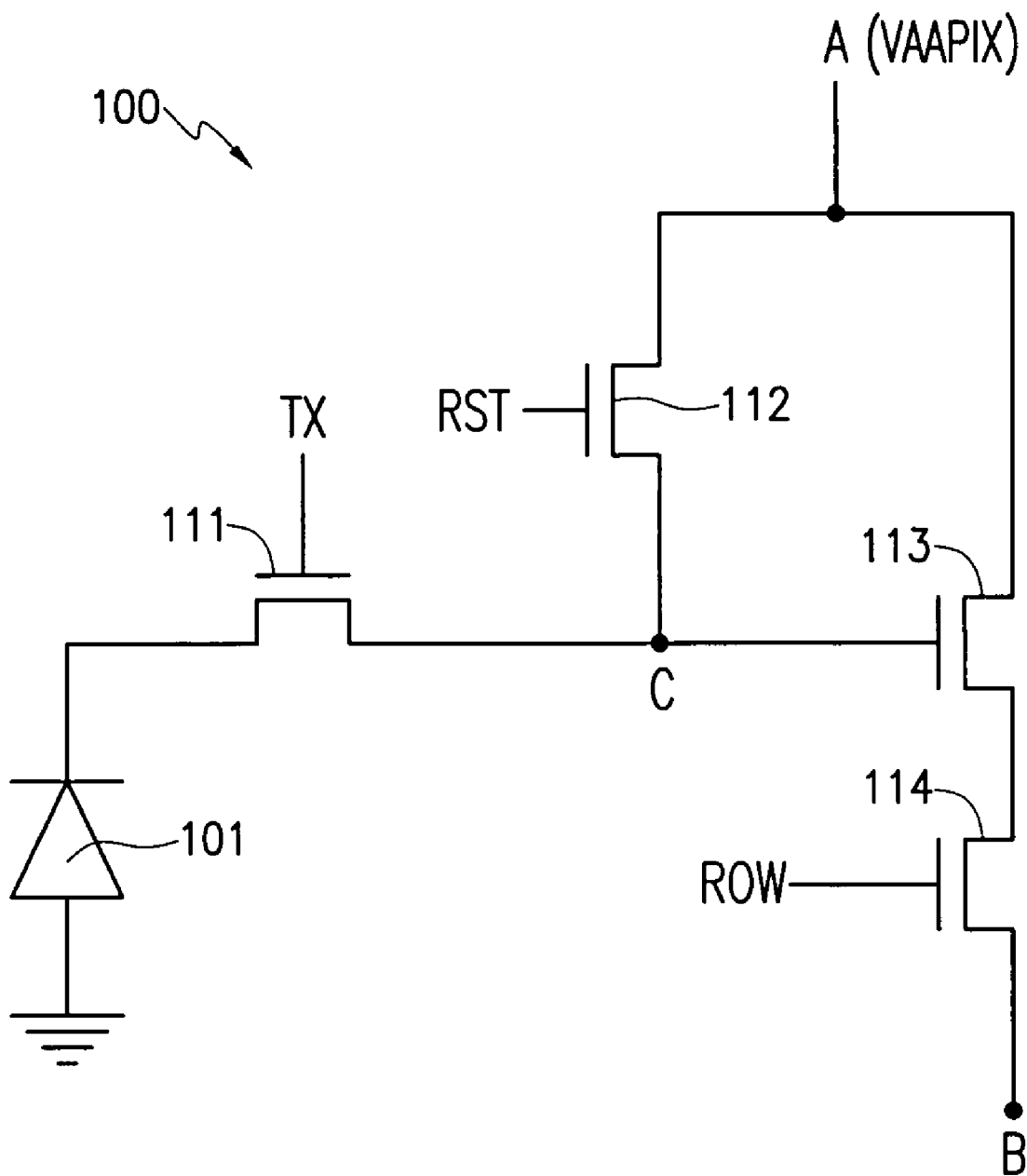
FIG. 1 illustrates a conventional pixel.
Figure 2:
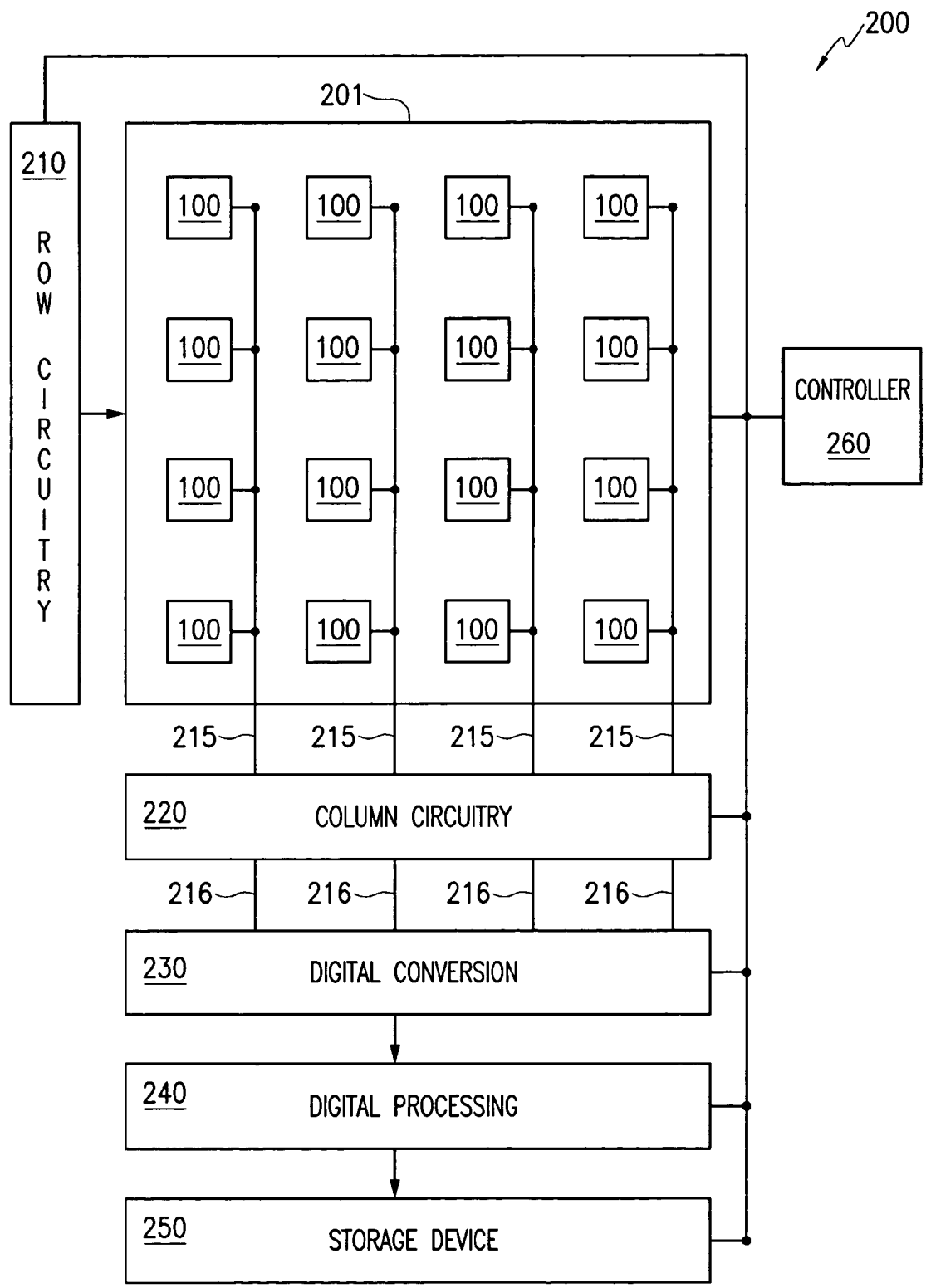
FIG. 2 illustrates an imager utilizing the pixel of FIG. 1.
Figure 3:
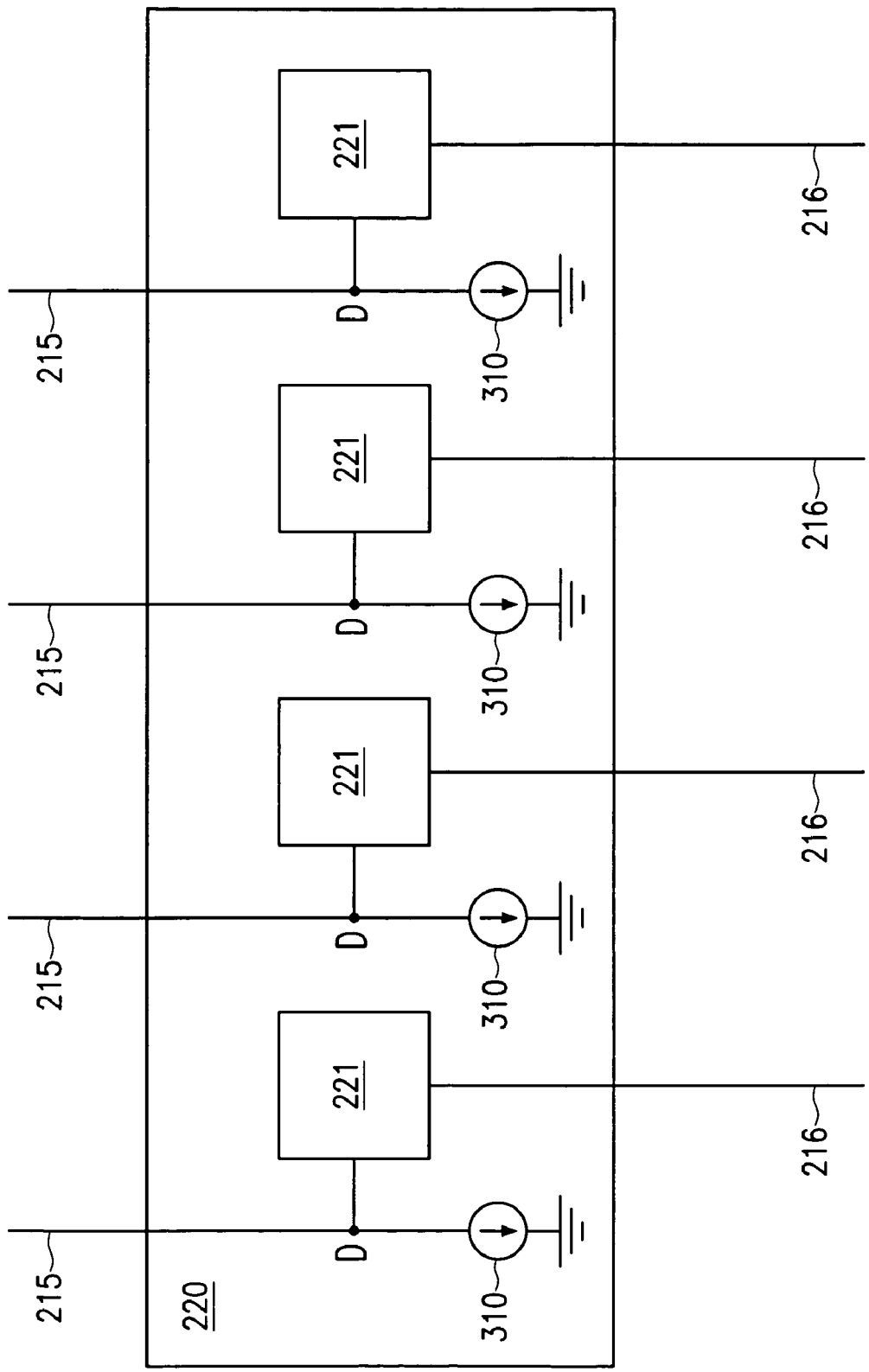
FIG. 3 illustrates column circuitry from the imager of FIG. 2.

Transistors 630 and 640 are preferably fabricated such that they can be characterized as having a reduced width-to-length (W/L) ratio as corresponding transistors 311 and 312 of the load circuit 310 (FIG. 3). Transistors 630 and 640 therefore have a higher overdrive (Vgs) voltage than transistors 311 and 312. This higher overdrive voltage ensures that the current source always stays in saturation.

The helper circuit 600 operates as follows. During any time when the pixel coupled to line 215 is not outputting a photo signal Vsig, at least one of control signals SHS and VLN_enable will be asserted low, thereby causing the AE_voltage bias signal to be at VAAPIX. However, when the pixel coupled to line 215 is outputting the photo signal Vsig, both control signals SHS and VLN_enable will be asserted high, causing the voltage level of the AE_voltage bias signal to be lower in voltage than VAAPIX. The degree by which the AE_voltage bias signal voltage level is lower than the VAAPIX voltage is based on the voltage level of the VLN_bias control signal and the narrower width-to-length ratios (and thus the higher overdrive voltages) of transistors 630 and 640.

The photo signal monitor circuit 500 comprises a load 510, a first transistor 521, and a second transistor 522. The load 510 and the transistors 521, 522 are connected in series, as shown in FIG. 7, between a source of pixel power VAAPIX and node D. Additionally, line 531 is coupled between load 510 and transistor 521. Line 531 outputs the RESET_pullup control signal, which as described below is supplied to the analog processing circuit 221'.

Figure 4:
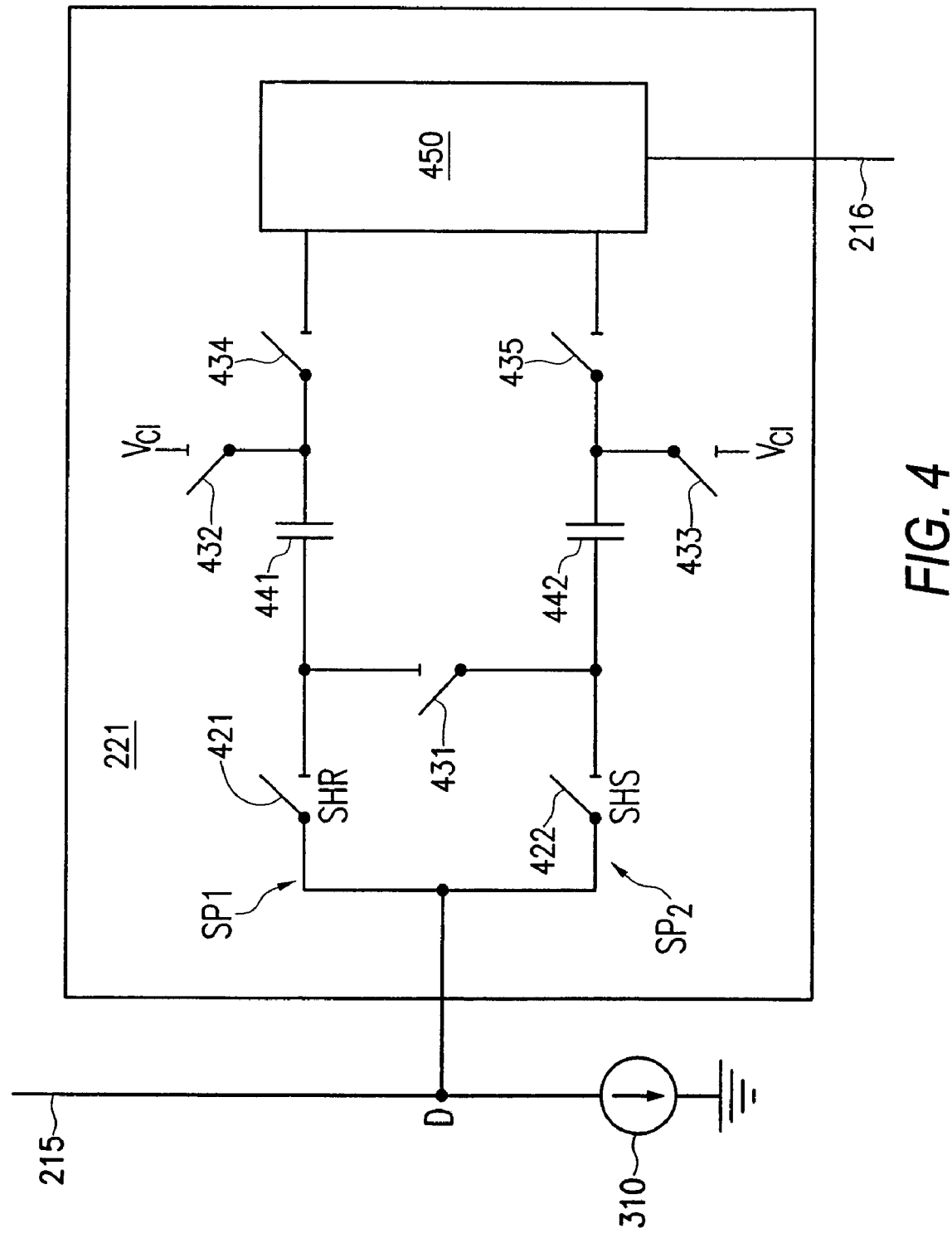
FIG. 4 illustrates a portion of the column circuitry, including the analog processing circuit, in greater detail.

Now also comparing FIG. 7 with FIG. 4 (illustrating the conventional analog processing circuit 221), it can be seen that the analog processing circuit 221' (FIG. 7) includes all of the components of the conventional analog processing circuit 221 (FIG. 4). The analog processing circuit 221', however, includes an additional transistor 460. In one exemplary embodiment, the additional transistor 460 is a PMOS transistor having one source/drain coupled to a source of pixel power VAAPIX and another source/drain coupled between switch 421 and capacitor 441. The gate of transistor 460 is coupled to line 531 to receive the RESET_pullup control signal. Thus, if the RESET_pullup control signal is asserted high, the transistor 460 is non-conductive, and does not have any affect on the charge stored on capacitor 441. However if the RESET_pullup control signal is asserted low, the transistor 460 becomes conductive, thereby coupling capacitor 441 to pixel power VAAPIX via transistor 460, and changing the charge level of capacitor 441.

The invention operates as follows. First, before any pixel signals are processed, the charge level of capacitor 441 (for sampling and holding the reset signal Vrst) and capacitor 442 (for sampling and holding the photo signal Vsig) are set to a predetermined state. Since the pixel coupled to line 215 is not outputting either a photo signal or a reset signal at this time, both the SHR and SHS control signals are asserted low. Additionally, the VLN_enable control signal is also asserted low.

In circuit 600, both transistors 620 and 630 are set to a non-conducting state respectively via control signal SHS and VLN_enable. As a result, the AE_voltage bias signal is set to VAAPIX.

In circuit 500, transistor 522 is set to a non-conducting state. As a result, the RESET_pullup control signal is asserted high.

In circuit 221', the low asserted SHR and SHS control signals set switches 421 and 422 to an open state. Additionally, switches 432, 433, 434, and 435 are also set to an open state, while switch 431 is set to a closed state. The RESET_pullup control signal is asserted high, thereby causing PMOS transistor 460 to become non-conductive. Thus, the plates of capacitors 441, 442 nearest to switch 431 are coupled to each other, thereby equalizing their charges levels. Switches 432, 433 are then set to a closed state thereby coupling the plates of capacitors 441, 442 closest to gain stage 450 to a clamp voltage Vcl. After a predetermined time, switches 431, 432, 433 are set to an open state and the charges on capacitors 441, 442 have been initialized to a known predetermined state.

Second, when the pixel outputs the reset signal, the voltage level of the reset signal is sampled and held by capacitor 441 when SHR is asserted high. Since the pixel is outputting a reset signal on line 215, the SHR and VLN_enable control signals are asserted high, while the SHS control signal is asserted low.

In circuit 600, transistor 620 is set to a non-conducting state because the SHS control signal is asserted low. Accordingly, the helper circuit 600 sets AE_voltage at VAAPIX.

In circuit 500, transistor 522 is set to a non-conducting state because the SHS control signal is asserted low. As a result, the circuit 500 outputs a high RESET_pullup voltage.

In circuit 221', switch 421 is set to a closed state by the high SHR control signal, while switch 422 is set to an open state by the low SHS control signal. During this time, switches 431, 432, 433, 434, 435 are each in the open state. The high RESET_pullup voltage sets transistor 460 to a non-conductive state. As a result, the reset signal Vrst is coupled to, and charges capacitor 441.

Next, when the pixel stops outputting the reset signal Vrst on line 215, the SHR and VLN_enable control signals are asserted low.

In circuit 600, transistor 620 is still set to a non-conducting state because the SHS control signal is still asserted low. Thus, circuit 600 still outputs the AE_voltage bias signal at the VAAPIX voltage level.

In circuit 500, transistor 522 is still set to a non-conducting state because the SHS control signal is still asserted low. Thus, the circuit 500 continues to output a high RESET_pullup control signal.

In circuit 221', the low SHR control signal causes switch 421 to be set to an open state. The high RESET_pullup control signal maintains the transistor 460 in a non-conducting state. As a result, the previously sampled reset signal Vrst is now held in capacitor 441.

When the pixel outputs a photo signal Vsig on line 215, the SHS and VLN_enable control signals are asserted high, while the SHR control signal is asserted low.

In circuit 600, each one of transistors 610, 620, 630, and 640 are conducting. The voltage level of the AE_voltage bias signal becomes lower than VAAPIX and is dependent upon the voltage level of the VLN_bias control signal and the threshold voltages of transistors 610, 620, 630, and 640.

In circuit 500, the amount of current flowing through load 510 and transistors 521 and 522 is dependent upon the voltage level of the photo signal Vsig. Under normal circumstances, no current flows through the circuit 500, thereby maintaining the voltage of RESET_pullup at a high voltage. As the pixel is exposed to brighter and brighter light, the signal voltage at the gate of the source follower of the pixel diminishes. In one exemplary embodiment, the pixel begins to saturate as the photo signal approaches 0.8 volts. At this point, no current flows through circuit 500. By the time the photo signal approaches 0.4 volt, the circuit 500 is conductive and becomes more conductive as the photo signal level continues to drop. Once the circuit 500 becomes conductive, the voltage level of the RESET_pullup control signal begins to drop. As discussed below in greater detail in connection with circuit 221', this begins to charge capacitor 441 with an alternate reset signal through transistor 460.

In circuit 221', the high SHS control signal sets switch 422 to a closed state while the low SHR control signal sets switch 421 in an open state. This permits the photo signal Vsig to be sampled by capacitor 442.

If circuit 500 produces a high RESET_pullup control signal, transistor 460 remains non-conducting and the previously sampled reset signal Vrst remains unaltered as stored in capacitor 441. However, if circuit 500 produces a RESET_pullup control signal which causes transistor 460 to become conductive, the previously stored reset signal Vrst is altered by charging capacitor 441 with voltage source VAAPIX via transistor 460. The charging rate is dependent upon the conductivity of the transistor 460, which is based on the voltage level of the RESET_pullup control signal.

When the pixel finishes outputting the photo signal, control signals SHS and VLN_enable are each asserted low.

In circuit 600, both transistors 620 and 630 become non-conductive, thereby setting the AE_voltage bias signal to the VAAPIX voltage level.

In circuit 500, transistor 522 becomes non-conductive, thereby asserting RESET_pullup at the high level.

In circuit 221', the high RESET_pullup signal sets transistor 460 to the non-conductive state. Switch 422 is opened. By this time, the photo signal Vsig is sampled and held by capacitor 442. If the power supply VAAPIX never charged capacitor 441, the originally sampled and held reset signal Vrst is stored in capacitor 441. However, if the power supply was used to charge capacitor 441, that indicates that the photo signal output was so diminished in voltage that there was a significant risk that the originally sampled reset signal was subjected to an eclipse distortion. For this reason, the originally sampled reset signal is altered by charging capacitor 441 with the power supply VAAPIX.

The present invention is therefore directed to an anti-eclipse circuit which cooperates with the sample and hold circuit for sampling and holding the reset and photo signals. When a pixel is outputting a reset signal, that reset signal is initially sampled and held. Then, when the pixel is outputting the photo signal, the voltage level of the photo signal is used to determine whether the incident light upon the pixel significantly exceeds the saturation limit of the pixel. If so, there is a risk of an eclipse, and the previously sampled and held reset signal is further charged to normalize the reset signal sample.

Figure 8:
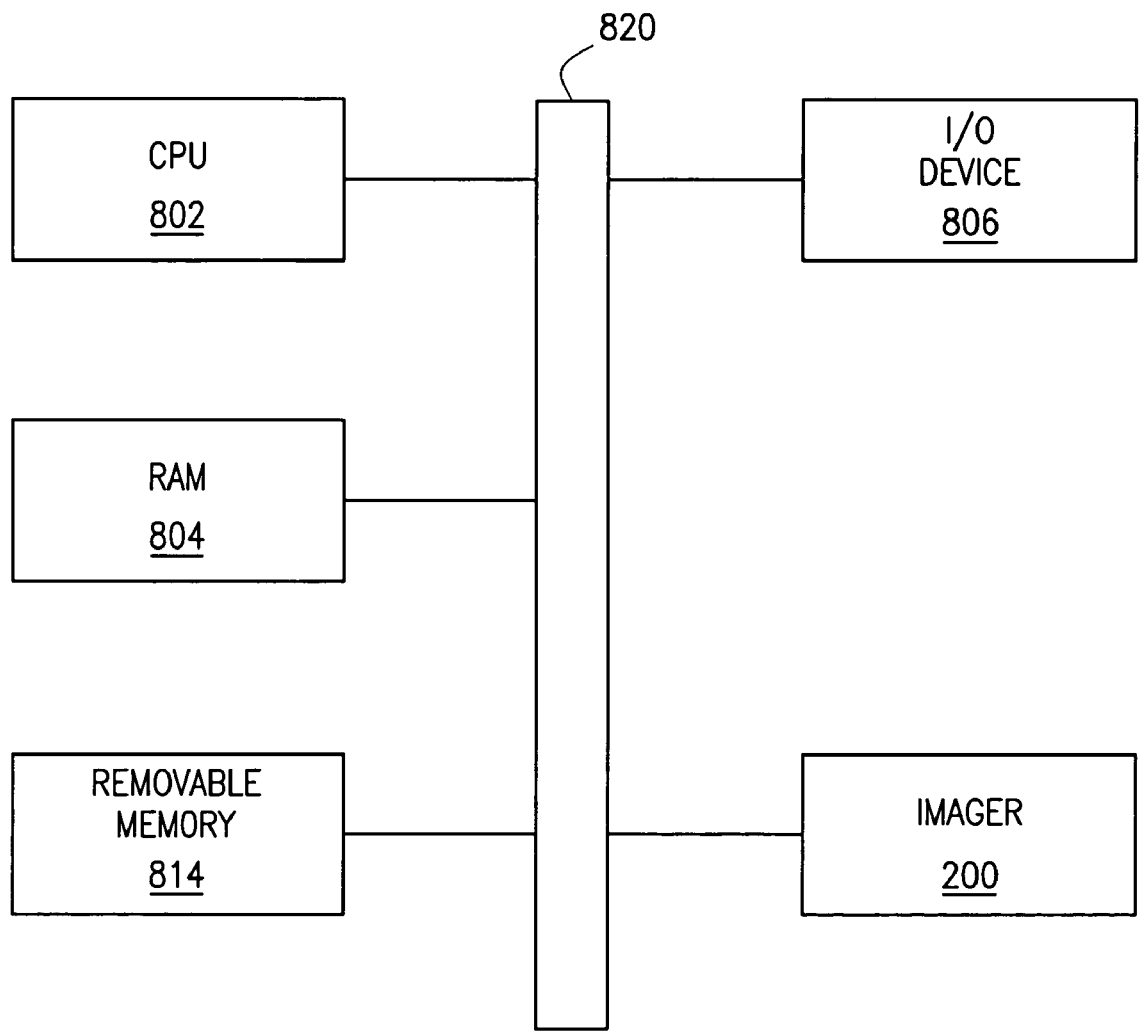
FIG. 8 illustrates a system incorporating an imager having the circuits of FIG. 7.

FIG. 8 illustrates a processor based system 800. The system 800 is exemplary of a digital system having an imaging device. Without being limited, system 800 could be a part of a computer system, camera, scanner, machine vision system, vehicle or personal navigation system, portable telephone with camera, video phone, surveillance system, auto focus system, optical tracking system, image stabilization system, motion detection system, or other system having an imaging function. System 800, for example, a camera, generally comprises a bus 820. Coupled to the bus 820 are a processor, such as CPU 802, a memory, such as a RAM 804, a removable memory 814, an I/O device 806, and an imager 200 including the circuit 700 (FIG. 7).

It should be appreciated that other embodiments of the invention include a method of manufacturing the circuit 700. For example, in one exemplary embodiment, a method of manufacturing an anti-eclipse circuit includes the steps of providing, over a portion of a substrate corresponding to a single integrated circuit, at least a plurality of pixels 100, and column circuitry 220' including circuits 700. The pixels 100, column circuitry 220', and circuits 700 can be fabricated on a same integrated circuit using known semiconductor fabrication techniques.

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. An anti-eclipse circuit for an imager, comprising:
a signal storing circuit connected to a column line and for storing a reset signal in a storage element at a first time and for storing a photo signal at a second time, said signal storing circuit comprising:
a replacement circuit for receiving a control signal on a control line and for replacing said stored reset signal with a correction signal in the storage element during the second time if said control signal is asserted in a first state, wherein said correction signal is used as said stored reset signal; and
a detection circuit for monitoring a voltage level of said photo signal and asserting said control signal, said detection circuit asserting said control signal in said first state when said voltage level is less than a predetermined threshold, wherein said detection circuit comprises:
a first circuit;
an output node coupled to said control line;
a bias transistor; and
a switch transistor,
wherein:
said first circuit is coupled in series between a power supply and said output node,
said output node is coupled to said bias transistor via a first source/drain of said bias transistor,
said bias transistor is coupled to said switch transistor via a second source/drain of said bias transistor and a first source/drain of said switch transistor, and
said switch transistor is coupled to said column line via a second source/drain of said switch transistor.

2. The anti-eclipse circuit of claim 1, wherein:
said first circuit is a NMOS transistor;
a first source/drain of said NMOS transistor is coupled to said power supply;
a gate of said NMOS transistor is coupled to said power supply; and
a second source/drain of said NMOS transistor is coupled to said output node.

3. The anti-eclipse circuit of claim 1, wherein:
said first circuit is a PMOS transistor;
a first source/drain of said PMOS transistor is coupled to said power supply;
a gate of said PMOS transistor is coupled to a source of ground potential; and
a second source/drain of said PMOS transistor is coupled to said output node.

4. The anti-eclipse circuit of claim 1, wherein:
a gate of said bias transistor is coupled to a bias line, and
said anti-eclipse circuit further comprises:
a bias circuit comprising:
a second circuit;
a bias control node, coupled to said bias line;
a first transistor;
a second transistor;
a third transistor; and
a fourth transistor,
wherein:
said second circuit is coupled in series between a power source and a source/drain of said first transistor,
said first transistor, said second transistor, said third transistor, and said fourth transistor are coupled in series via their respective sources/drains, and
said fourth transistor is coupled via one of its source/drain to a source of ground potential.

5. The anti-eclipse circuit of claim 4, wherein:
said column line is coupled to a load circuit comprising a first load transistor and a second load transistor;
said first load transistor and said second load transistor share a first width-to-length (W/L) ratio;
said third and fourth transistors share a second W/L ratio; and
said first W/L ratio is greater than said second W/L ratio.

6. An imager, comprising:
an array of pixels for producing respective reset signals and photo signals;
a column circuit, coupled to said array of pixels via a plurality of column lines, for selecting a row of pixels from said array for processing, said column circuit comprising:
a plurality of signal storing circuits, each connected to a column line and for storing said reset signal in a storage element produced by a respective pixel at a first time, and for storing said photo signal produced by said respective pixel at a second time, each of said signal storing circuits comprising:
a replacement circuit, for receiving a control signal on a control line and for replacing said stored reset signal with a correction signal in the storage element during the second time if said control signal is in a first state, wherein said correction signal is used as said stored reset signal; and
a detection circuit for monitoring a voltage level of said photo signal and asserting said control signal, said detection circuit asserting said control signal in said first state when said voltage level is less than a predetermined threshold, wherein each of said detection circuits comprises:
a first circuit;
an output node coupled to said control line;
a bias transistor; and
a switch transistor,
wherein:
said first circuit is coupled in series between a power supply and said output node,
said output node is coupled to said bias transistor via a first source/drain of said bias transistor,
said bias transistor is coupled to said switch transistor via a second source/drain of said bias transistor and a first source/drain of said switch transistor, and
said switch transistor is coupled to said column line via a second source/drain of said switch transistor.

7. The imager of claim 6, wherein:
said first circuit is a NMOS transistor;
a first source/drain of said NMOS transistor is coupled to said power supply;
a gate of said NMOS transistor is coupled to said power supply; and
a second source/drain of said NMOS transistor is coupled to said output node.

8. The imager of claim 6, wherein:
said first circuit is a PMOS transistor;
a first source/drain of said PMOS transistor is coupled to said power supply;
a gate of said PMOS transistor is coupled to a source of ground potential; and
a second source/drain of said PMOS transistor is coupled to said output node.

9. The imager of claim 6, wherein a gate of said bias transistor is coupled to a bias line, and said column circuit further comprises:
at least one bias circuit comprising:
a second circuit;
a bias control node coupled to said bias line;
a first transistor;
a second transistor;
a third transistor; and
a fourth transistor,
wherein:
said second circuit is coupled in series between a power source and a source/drain of said first transistor,
said first transistor, said second transistor, said third transistor, and said fourth transistor are coupled in series via their respective sources/drains, and
said fourth transistor is coupled via one of its source/drain to a source of ground potential.

10. The imager of claim 9, wherein:
said column line is coupled to a load circuit comprising a first load transistor and a second load transistor;
said first load transistor and said second load transistor share a first width to length (W/L) ratio;
said third and fourth transistors share a second W/L ratio; and
said first W/L ratio is greater than said second W/L ratio.

* * * * *